(12) United States Patent
Hanna et al.

(10) Patent No.: US 8,245,596 B2
(45) Date of Patent: *Aug. 21, 2012

(54) PARKING BRAKE

(75) Inventors: Ronald J. Hanna, Mancelona, MI (US);
Brooke Elsener, East Jordan, MI (US);
Jeremy Gill, Jacksonville, FL (US);
Brian J. Eckerle, Mancelona, MI (US);
James Allen, Bellaire, MI (US)

(73) Assignee: Dura Global Technologies, LLC, Auburn Hills, MI (US)

( * ) Notice: Subject to any disclaimer, the term of this patent is extended or adjusted under 35 U.S.C. 154(b) by 1207 days.

This patent is subject to a terminal disclaimer.

(21) Appl. No.: 11/846,750

(22) Filed: Aug. 29, 2007

(65) Prior Publication Data
US 2008/0116022 A1      May 22, 2008

Related U.S. Application Data

(63) Continuation-in-part of application No. 11/562,686, filed on Nov. 22, 2006.

(51) Int. Cl.
*G05G 1/00*    (2006.01)
*G05G 3/00*    (2006.01)
*G05G 1/30*    (2008.04)

(52) U.S. Cl. ............. 74/512; 74/560; 74/575; 74/577 R
(58) Field of Classification Search ............ 74/512–514, 74/560, 529, 535, 538, 575, 577 R; 188/2 D, 188/79.54; 192/111.12; *G05G 1/14*
See application file for complete search history.

(56) References Cited

U.S. PATENT DOCUMENTS

| | | | | | |
|---|---|---|---|---|---|
| 3,929,033 | A | * | 12/1975 | Marx | 74/512 |
| 5,247,850 | A | * | 9/1993 | Lenzke | 74/523 |
| 5,448,928 | A | * | 9/1995 | Harger | 74/523 |
| 5,624,352 | A | * | 4/1997 | Smale | 477/197 |
| 5,832,784 | A | * | 11/1998 | McCallips et al. | 74/512 |
| 6,817,264 | B2 | * | 11/2004 | Hiura et al. | 74/512 |
| 6,837,127 | B2 | * | 1/2005 | Schumacher | 74/512 |
| 8,113,086 | B2 | * | 2/2012 | Eckerle et al. | 74/512 |
| 2008/0236987 | A1 | * | 10/2008 | Eckerle et al. | 192/219.5 |

* cited by examiner

*Primary Examiner* — Vinh Luong
(74) *Attorney, Agent, or Firm* — Gifford, Krass, Sprinkle, Anderson & Citkowski, P.C.; Kevin S. MacKenzie; Dean B. Watson

(57) ABSTRACT

A park brake includes a brake lever that is movable about a pivot. A release mechanism is associated with the brake lever and includes a pawl adapted to contact and lock with a sector. A trigger is linked with the pawl and is moveable to change a moment of the pawl relative to the sector allowing selective movement of the brake lever.

22 Claims, 20 Drawing Sheets

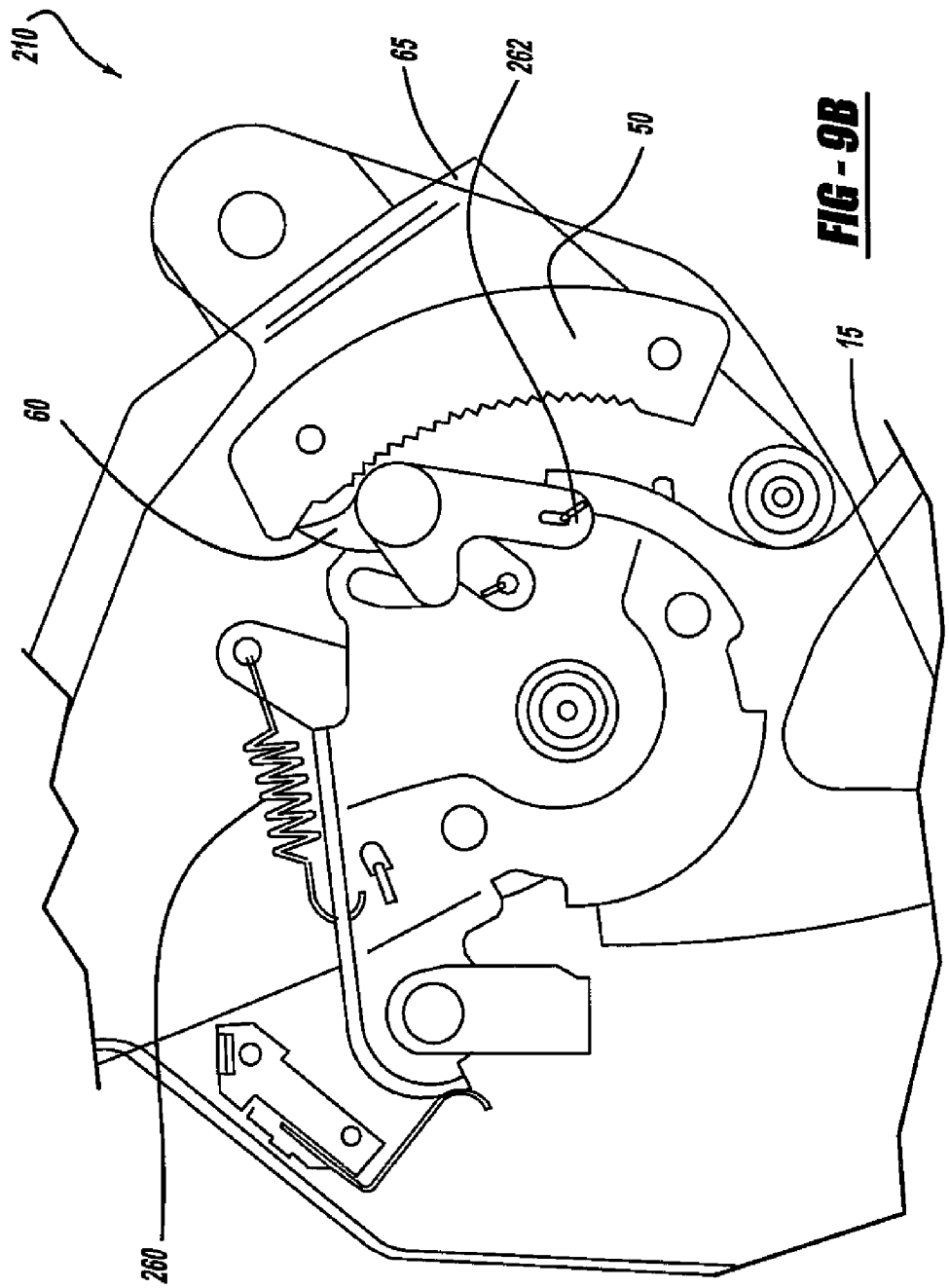

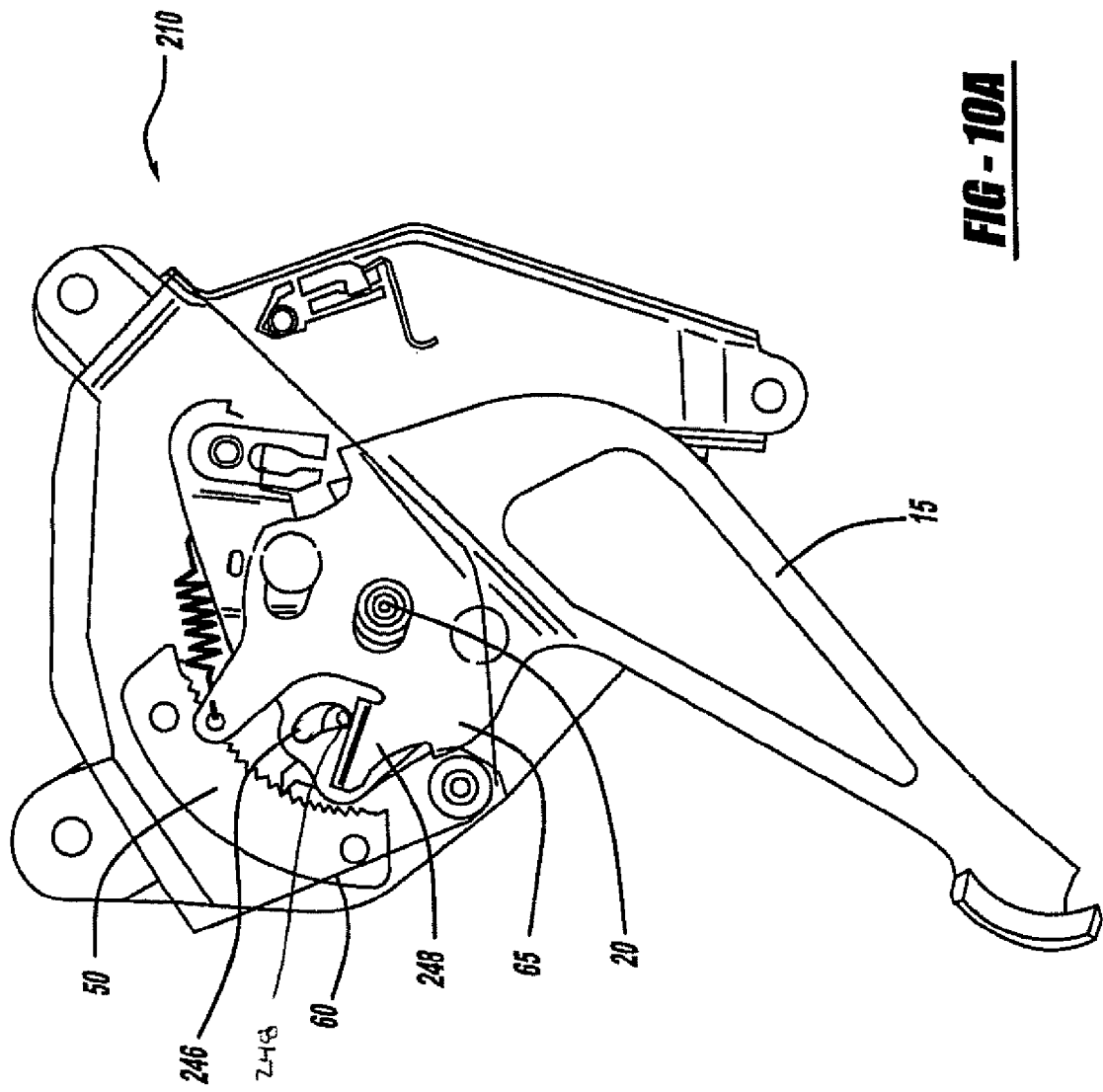

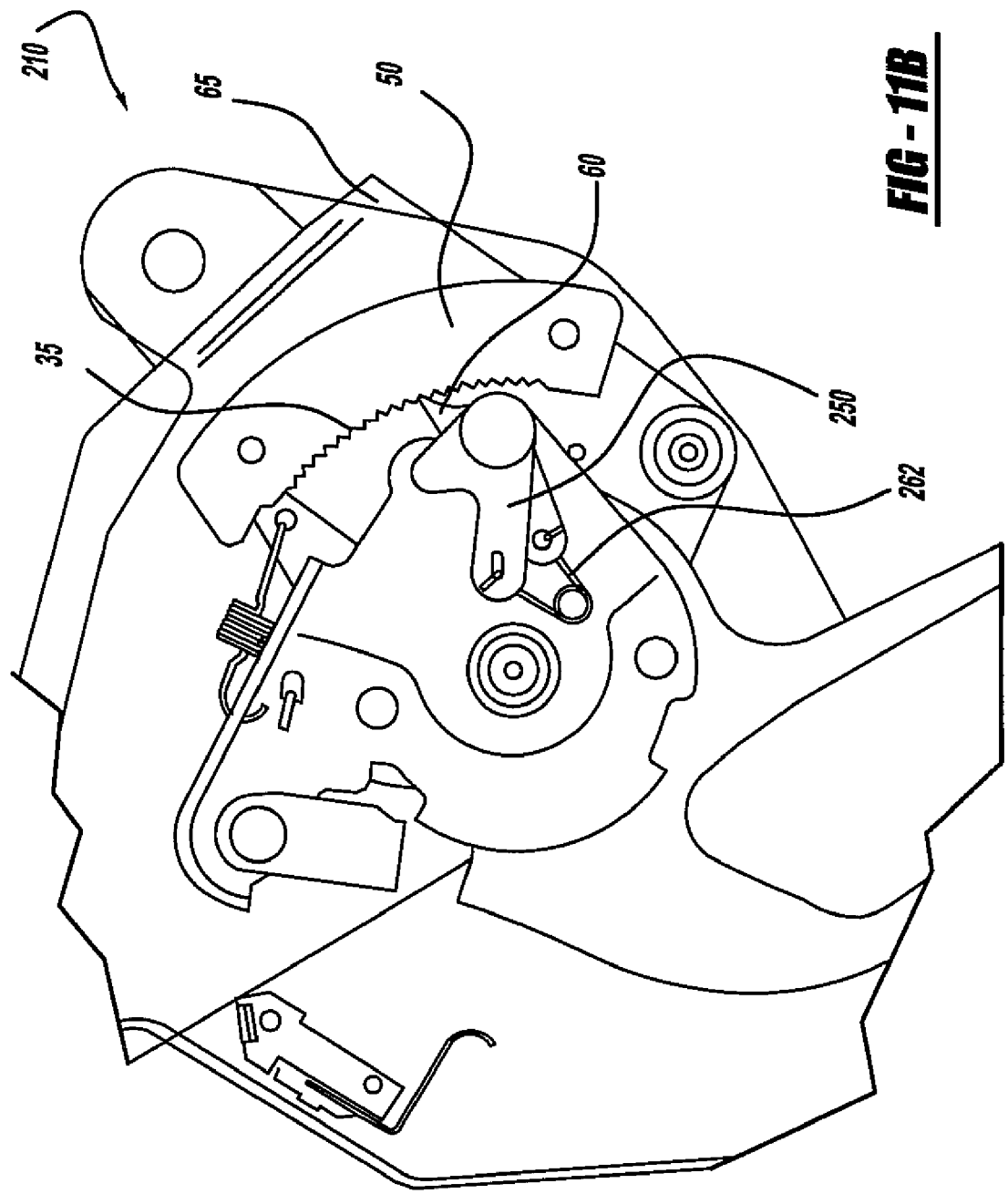

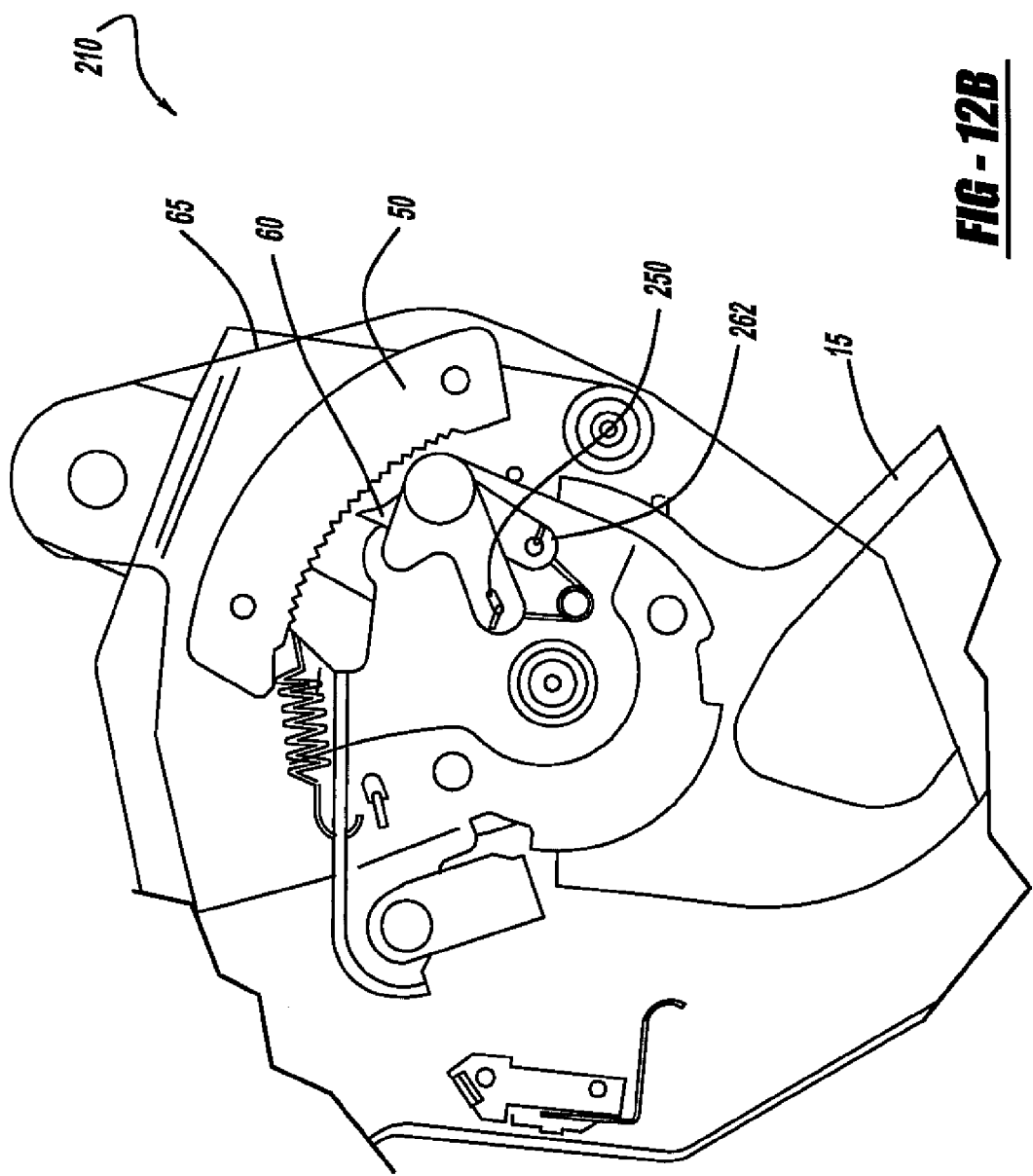

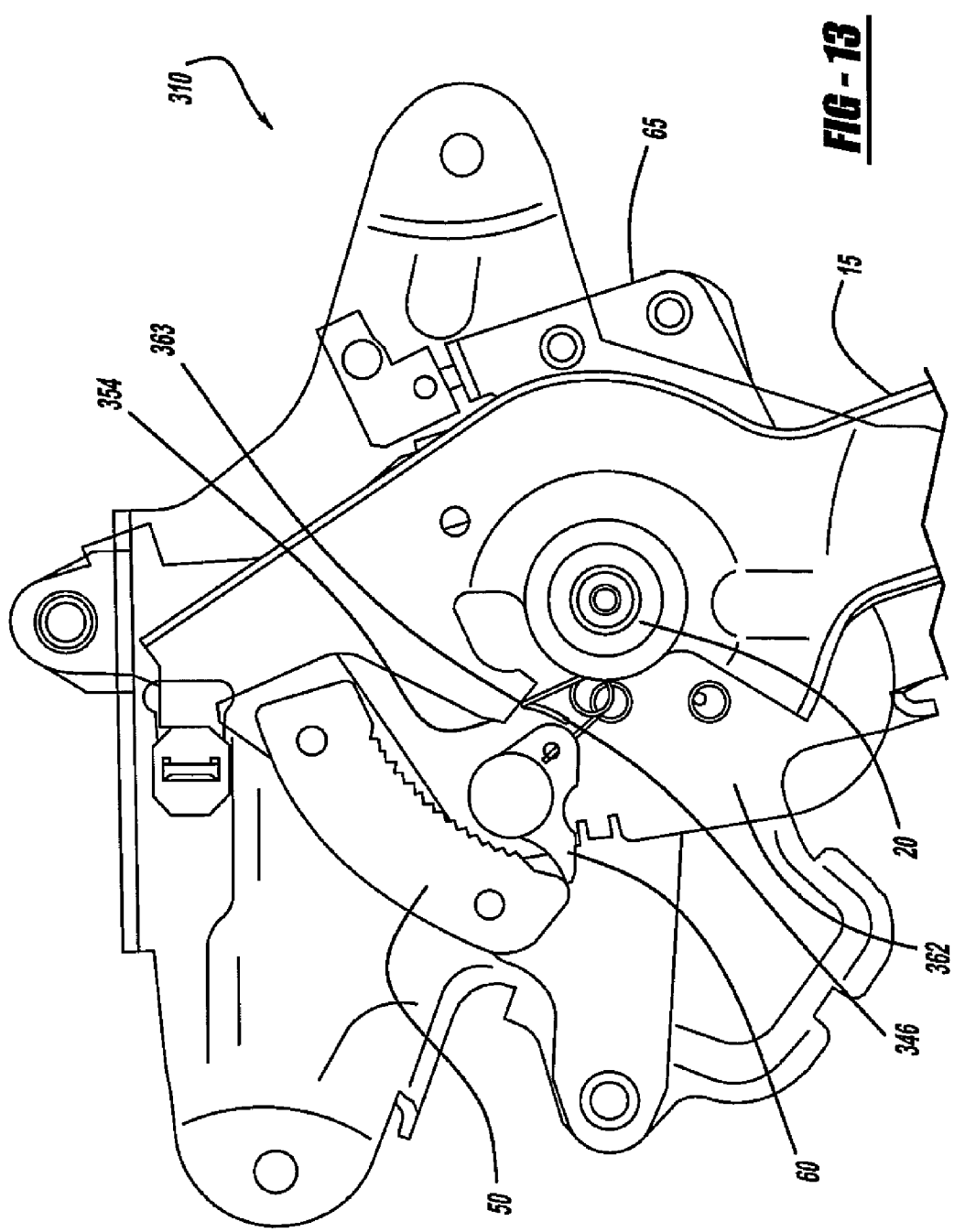

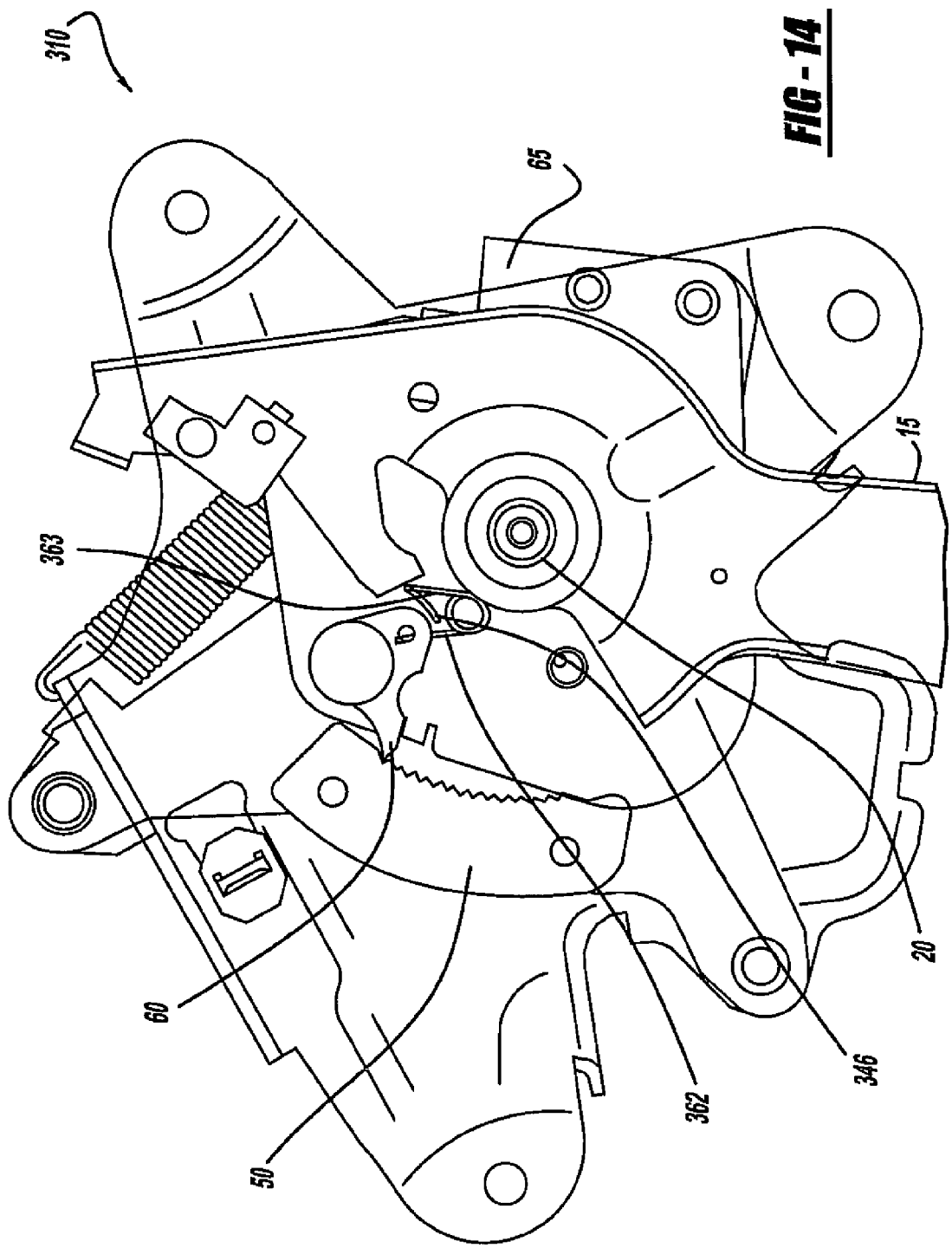

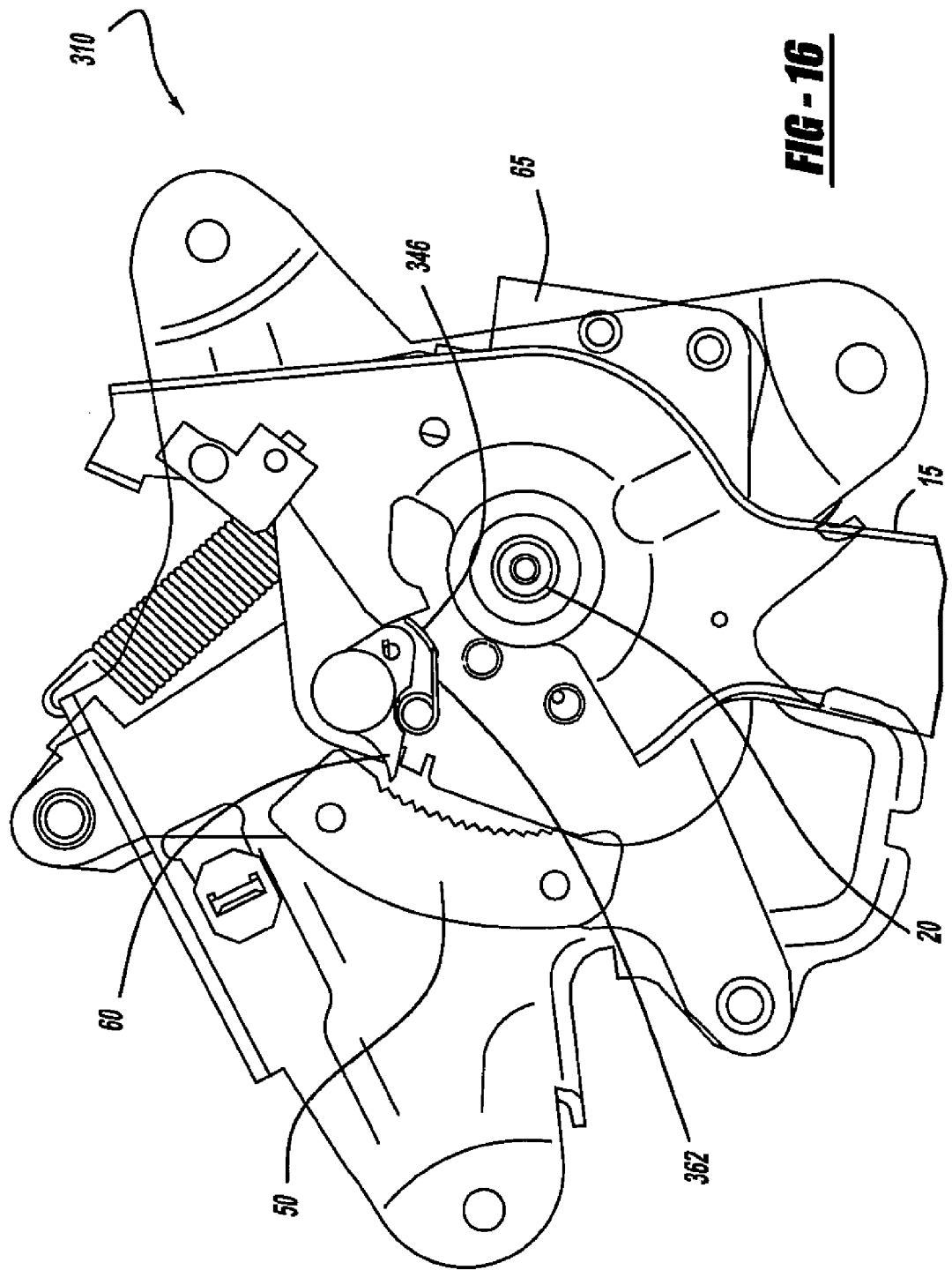

PARKING BRAKE

FIELD OF THE INVENTION

The invention relates to automotive parking brakes.

BACKGROUND OF THE INVENTION

Parking brake assemblies are known in the art and may include various mechanisms for locking and unlocking the parking brake. An example of one system includes a pawl and sector design wherein a pawl engages and disengages a sector to allow movement of a parking brake from a locked to an unlocked position. A cable that is associated or attached to the brake lever may display cable travel loss when the parking brake is moved between the locked and unlocked positions. On push to release brakes, this travel loss may be caused by sector tooth geometries, as well as travel of various components of the brake.

There is therefore a need in the art for an improved parking brake that limits the amount of cable travel loss.

SUMMARY OF THE INVENTION

In one aspect, a park brake includes a brake lever that is movable about a pivot. A release mechanism is associated with the brake lever and includes a pawl adapted to contact and lock with a sector. A trigger is linked with the pawl and is moveable to change a moment of the pawl relative to the sector allowing selective movement of the brake lever.

In another aspect, a park brake includes a brake lever that is movable about a pivot. A release mechanism is associated with the brake lever and includes a pawl adapted to contact and lock with a sector. A pawl spring is linked with the pawl and is moveable to change a moment of the pawl relative to the sector allowing selective movement of the brake lever.

BRIEF DESCRIPTION OF THE DRAWINGS

FIGS. 9A and 9B are partial side views of a second embodiment in a fully released position;

FIGS. 10A and 10B are partial side views of a second embodiment in an applying position;

FIGS. 11A and 11B are partial side views of a second embodiment in a locked position;

FIGS. 12A and 12B are partial side views of a second embodiment in a reapplied position;

FIG. 13 is a partial side view of a third embodiment in a fully released position;

FIG. 14 is a partial side view of a third embodiment in an applying position;

FIG. 16 is a partial side view of a third embodiment in a reapplied position.

DETAILED DESCRIPTION OF THE PREFERRED EMBODIMENTS

Figure 1:
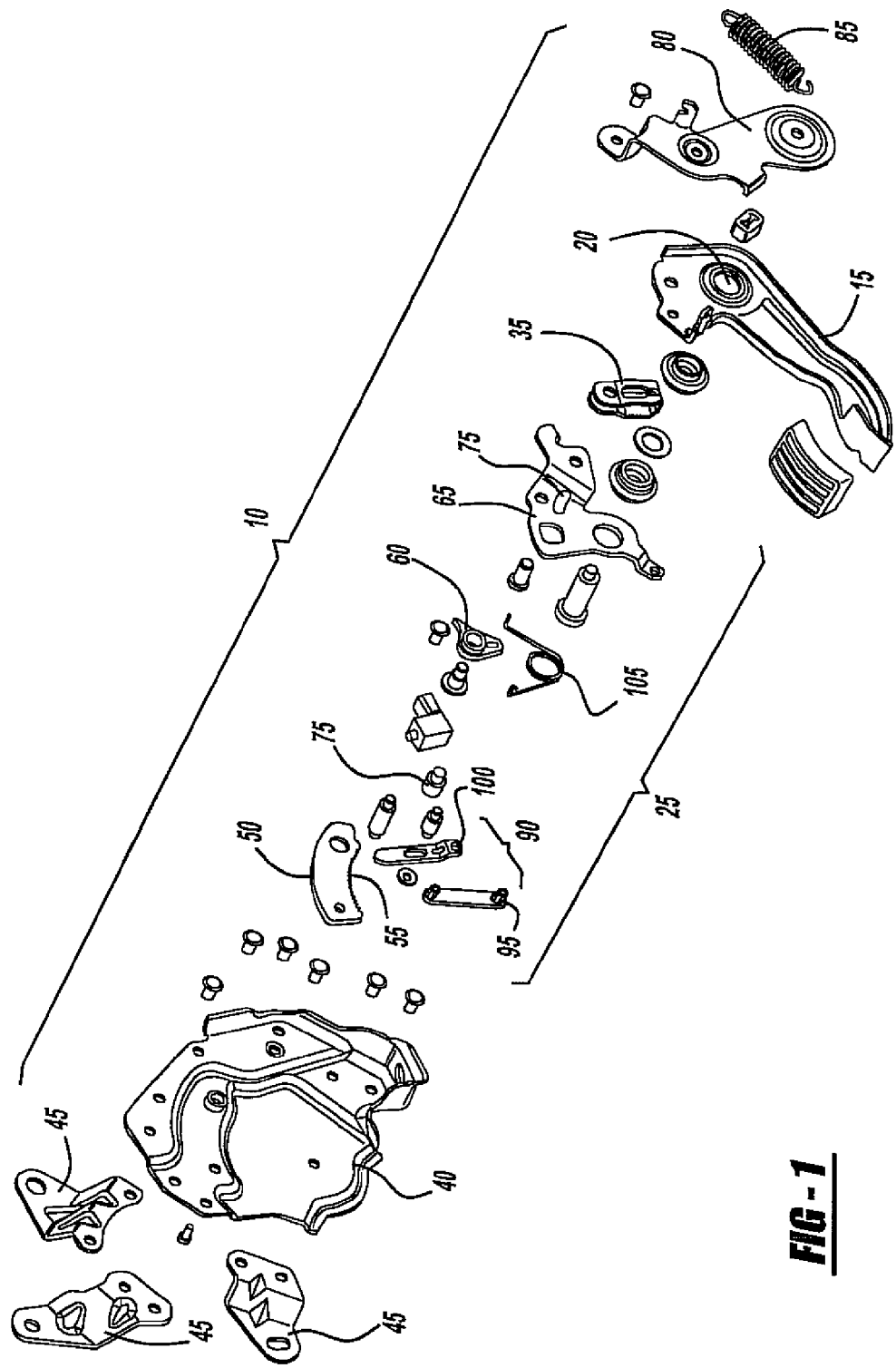
FIG. 1 is an exploded assembly view of a park brake.

Referring to FIG. 1, there is shown a park brake 10. The park brake 10 includes a brake lever 15 that is movable about a pivot 20. A release mechanism 25 is associated with the brake lever 15. The release mechanism 25 is actuable to allow selective movement of the brake lever 15. A cable 30 is connected to the release mechanism 25. The cable 30 is isolated from movement of the brake lever 15. The cable 30 may be connected to the release mechanism 25 at a clevis 35, as shown in FIG. 1 or it may alternatively be attached using any other suitable connection mechanism. Isolation of the cable 30 from movement of the brake lever 15 allows the release mechanism 25 to move independent of the brake lever 15 to minimize cable travel loss.

As stated above, the brake lever 15 is movable about a pivot 20 that is coupled to a housing 40. The housing 40 may include a shape having various detents and contours formed thereon to define an overall travel path of a brake lever 15. The housing 40 may be attached to a vehicle using attachment brackets 45. Additionally the housing 40 may include various slots and attachment members for connecting with the various components, as will be described in more detail below.

A sector 50 is attached to the housing. The sector 50 may have an arcuate shape with a plurality of teeth 55 formed thereon for engaging a pawl 60. The teeth 55 may be positioned relative to each other and to the overall shape of the sector 50 to achieve various design characteristics. The teeth 55 may have a root-to-tip distance designed to minimize travel loss. The design parameters of the sector 50 allow for the pawl 60 to contact and lock with the sector 50 to minimize cable travel loss in the park brake 10.

The park brake 10 includes a pawl plate 65 that is movable about the pivot 20 and contacts the brake lever 15. The pawl plate 65 includes the pawl 60 that is adapted to contact and lock with the sector 50. The pawl plate 65 includes a lost motion slot 70 formed therein. A rivet 75 associated with the brake lever 15 is positioned within the lost motion slot 70 and is movable within the lost motion slot 70 allowing for independent movement of the brake lever 15 and the pawl plate 65 decoupling the release mechanism 25 from the brake lever 15.

It should be realized that alternative members other than the rivet 75 may be utilized including a boss, projection, block or other such structure associated with the brake lever 15.

The park brake 10 may also include a cover 80 disposed about the pivot 20. The cover 80 may include a return spring 85 attached thereto. The first end of the return spring 85 may be attached to the cover 80 while the second end may be attached to the brake lever 15 for returning the brake lever 15 to a nominal or starting position after it has been moved to an applied position.

A linkage 90 may be connected to the pawl plate 65 and the brake lever 15. The linkage 90 may include first and second links 95, 100 with the first link 95 attached to the pawl plate 65 at one end and to the second link 100 at a second end. The second link 100 may be coupled to the brake lever 15. It should be realized that alternative linkages other than that disclosed and shown in FIG. 1 may be utilized. A spring member 105 having a first end attached to the pawl 60 and a second end attached to the second link 100 is disposed about the pivot 20. The linkage 90 is movable from a starting position to a cam over position when the pawl 60 locks with the sector 50, as will be discussed in more detail below. The spring member 105 translates between a compression and free state in response to cam over of the linkage 90. Additionally, the spring member 105 translates between the free state to a tension state in response to a force applied to the brake lever 15, again as will be discussed in more detail below.

Figure 2:
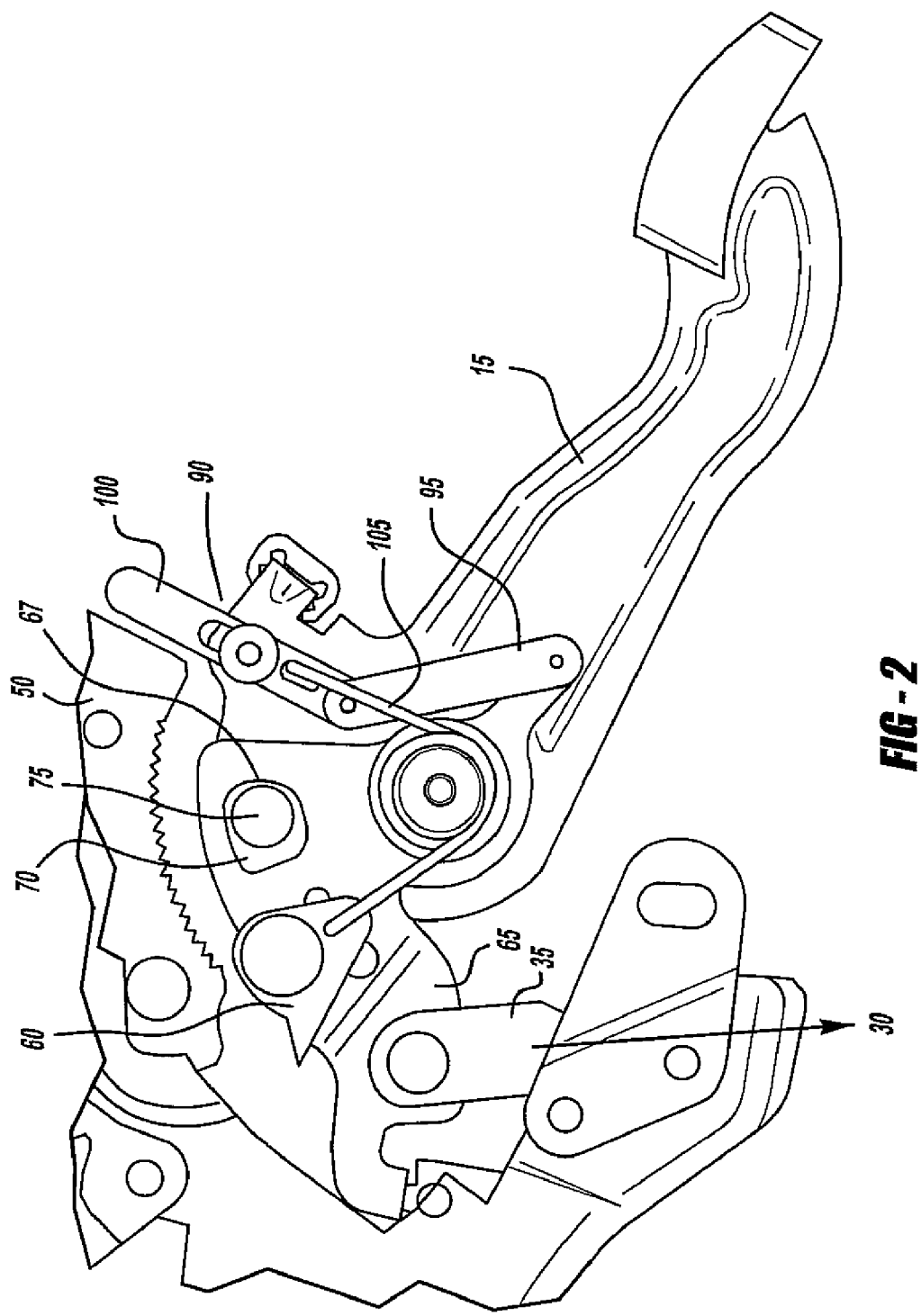
FIG. 2 is a partial side view of a park brake in a fully released position.

In use, the park brake 10 starts in a nominal position wherein the release mechanism is fully released, as shown in FIG. 2. As can be seen in the figure, the linkage 90 is located in a starting position wherein the links 95, 100 are located toward the left side of the figure in response to a radial preload force and/or a recock mechanism as will be described in more detail below. The spring member 105 is in a free-state position. The rivet 75 associated with the brake lever 15 is positioned within the lost motion slot 70 formed on the pawl plate 65. The rivet 75 is positioned toward the right in the figure and contacts a first end 67 of the lost motion slot 70 in response to an opposing cable load applied by the cable 30 at the clevis 35 which is attached to the pawl plate 65.

Figure 3:
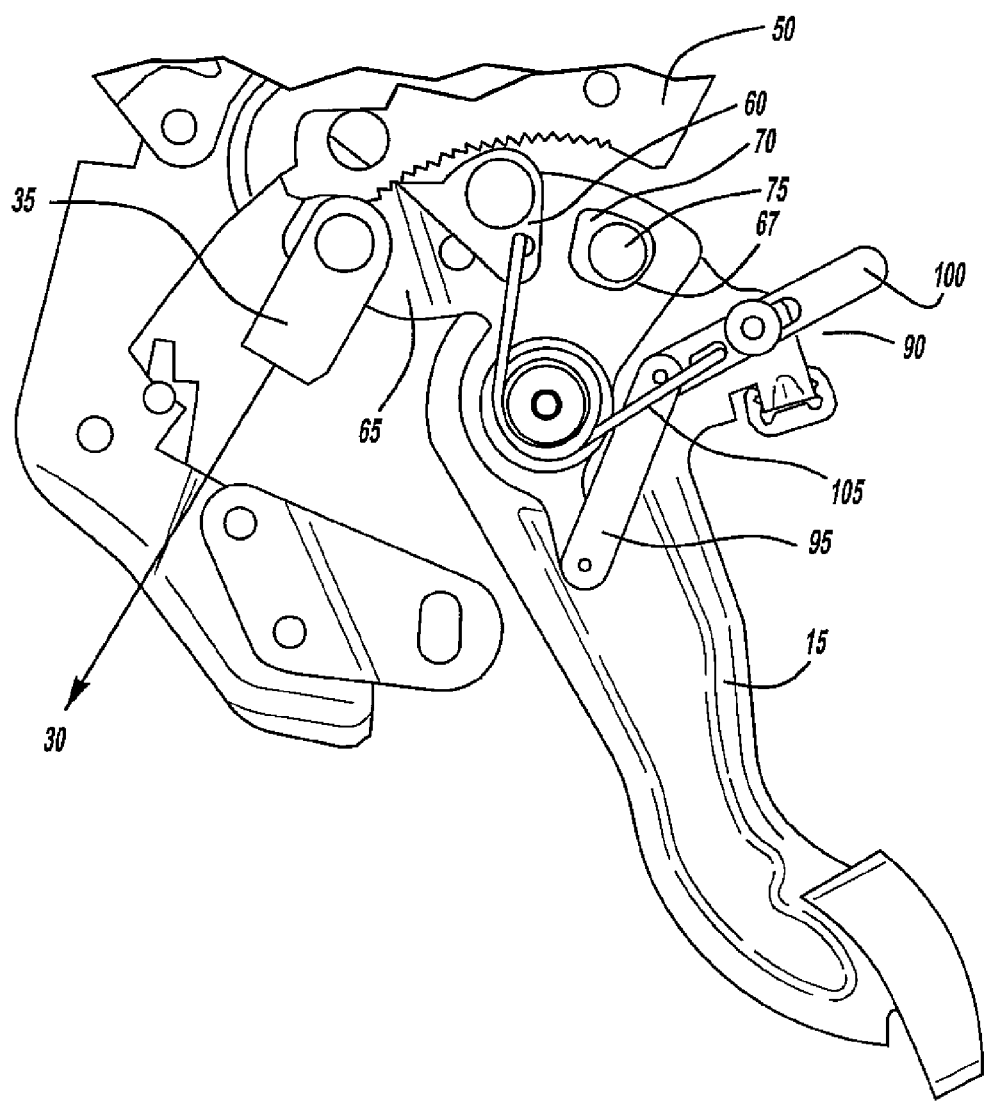
FIG. 3 is a partial side view of a park brake in an applying position.

When an operator applies a positive force on the brake lever 15, the park brake 10 is in an applying position, as shown in FIG. 3. The force applied to the brake lever 15 causes rotation of the brake lever 15 about the pivot 20. The rivet 75 associated with the brake lever 15 contacts the first end 67 of the lost motion slot 70 such that the force applied to the brake lever 15 causes the pawl plate 65 to move about the pivot 20. The linkage 90 remains positioned in the starting position toward the left due to a binding force at the reference circle intersections, as shown in FIG. 3. The pawl 60 connected to the pawl plate 65 contacts a surface on the sector 50 and applies a compression to the spring member 105 due to the increased positive rotation of the pawl 60 on the sector 50 surface.

Figure 4:
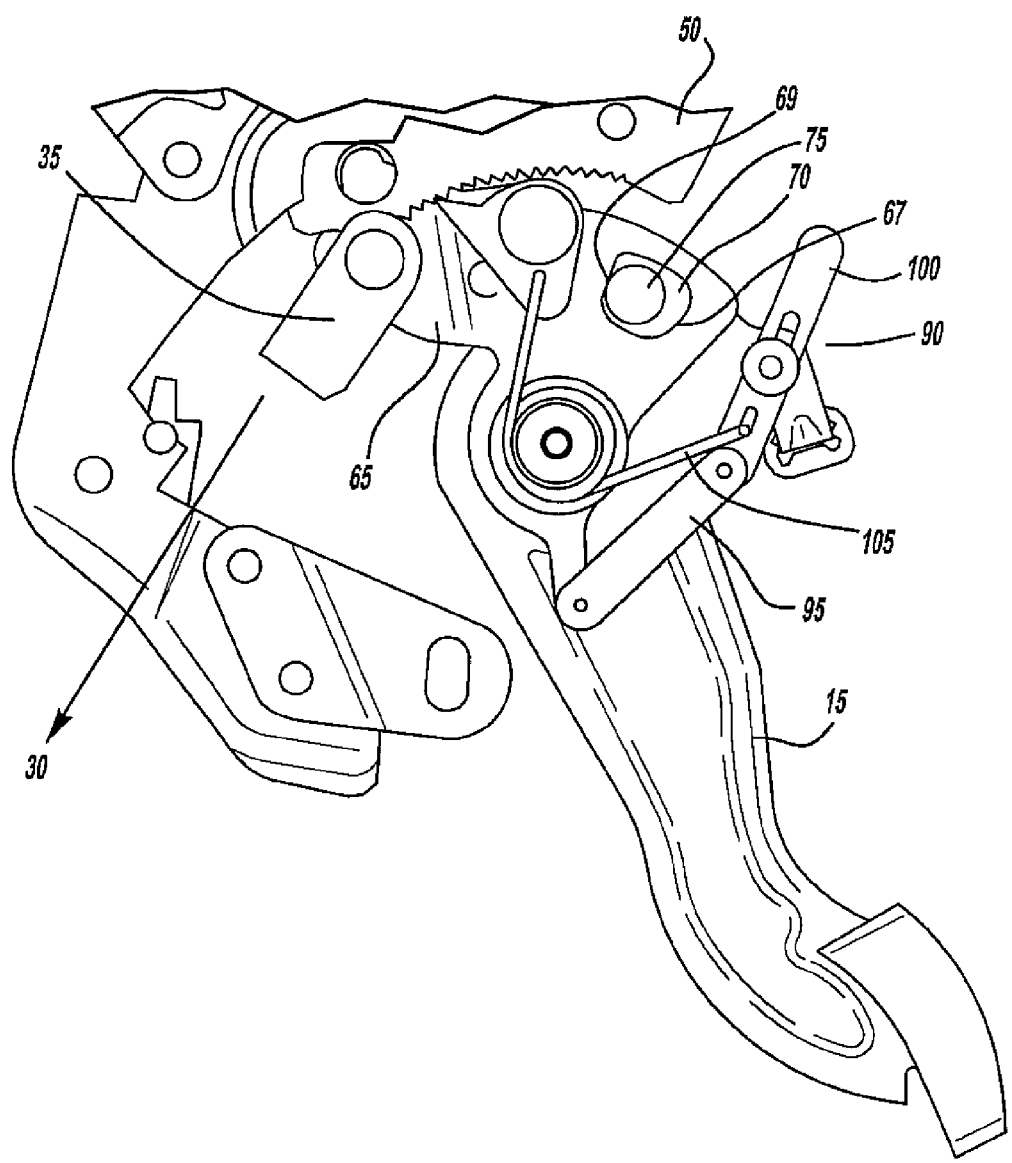
FIG. 4 is a partial side view of a park brake in a locked position.

When the force is removed from the brake lever 15, the park brake 10 is then in the locked position, as shown in FIG. 4. In the locked position, the pawl 60 locks with the sector 50 such that all opposing cable load is removed from the rivet 75 associated with the brake lever 15 and applied to the pawl 60. The rivet 75 associated with the brake lever 15 is translated towards the left in the figure towards an opposing end 69 of the lost motion slot 70 in response to the return spring 85 that is attached to the brake lever 15 at one end and the cover 80 at another end. The linkage 90 moves to the cam over position such that the linkage moves to the right in the figure due to the transfer of the load from the rivet 75 associated with the brake lever 15 to the pawl 60. In this manner, the compression within the spring member 105 causes the linkage 90 to cam over such that the spring member 105 returns to a free-state position. In the locked position, the pawl 60 is locked with the sector 50 and the brake lever 15 is moved from the nominal or starting position to the applied position.

Figure 5:
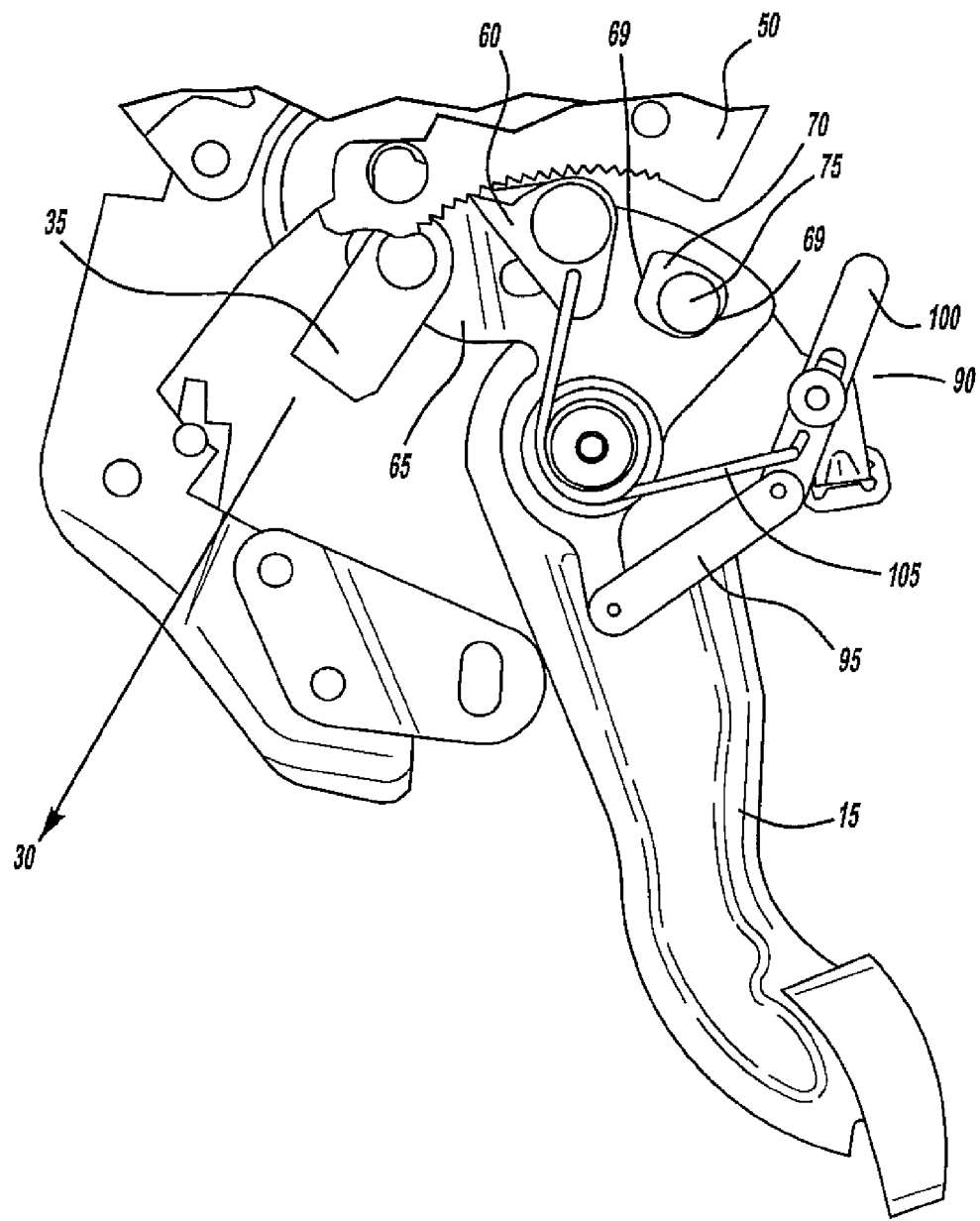
FIG. 5 is a partial side view of a park brake in a reapplied position.

To release the brake lever 15 from the applied position where the release mechanism is locked, a force is reapplied to the brake lever 15 as shown in FIG. 5. As can be seen in the figure, the linkage 90 is in the cam over position and the rivet 75 associated with the brake lever 15 is translated towards the right in the figure to contact the first end 67 of the lost motion slot 70 formed in the pawl plate 65. The load that has been applied to the pawl 60 when engaging the sector 50 is removed from the pawl 60 and sector 50 and is again applied to the rivet 75 contacting the first end 67 of the lost motion slot 70. The spring member 105 of the release mechanism 25 has a tension load applied to it. The tension load causes a negative rotation of the pawl 60 disengaging the pawl 60 from the sector 50. The linkage 90 remains in the cam over position.

Figure 6:
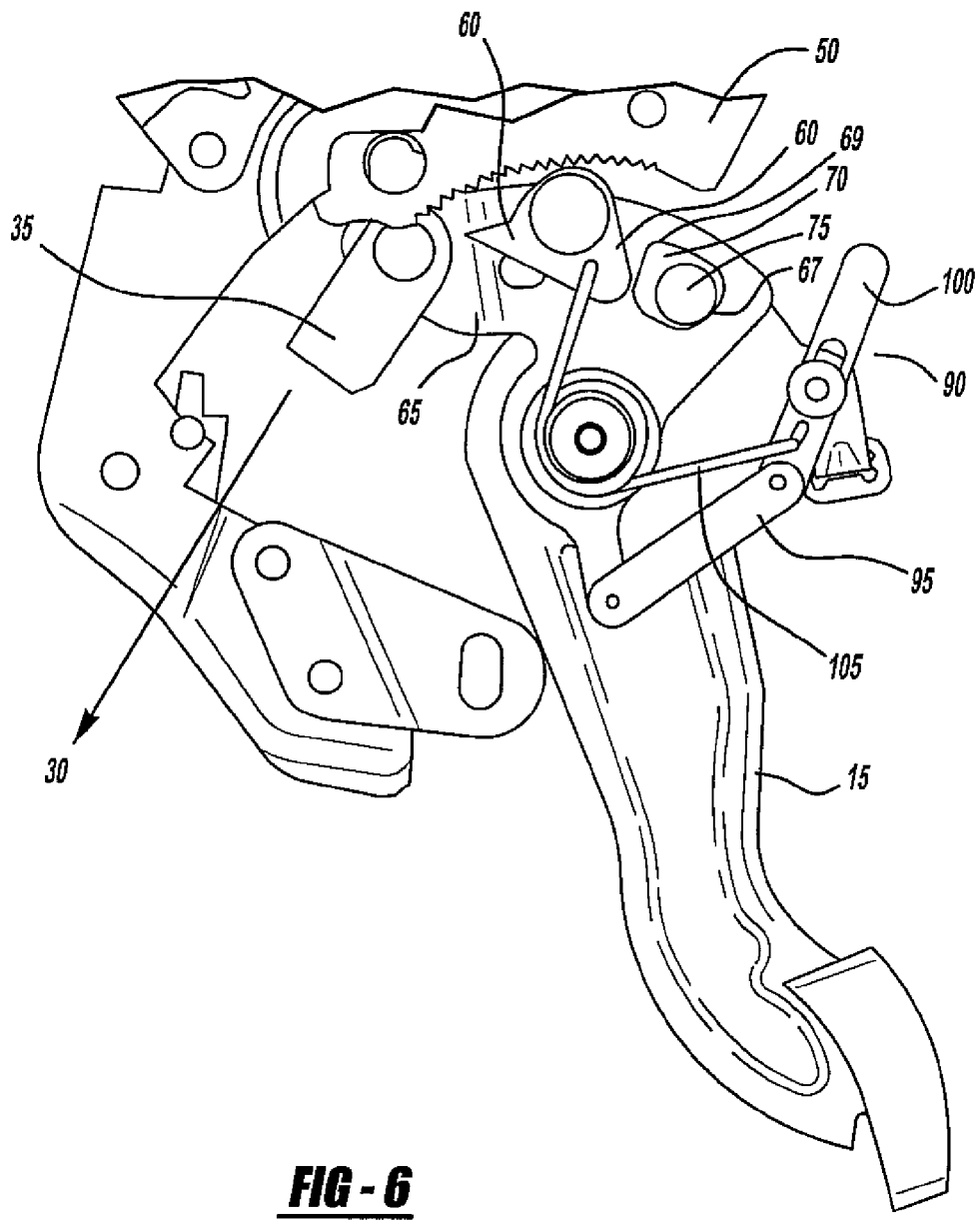
FIG. 6 is a partial side view of a park brake in a releasing position.

The force reapplied to the brake lever 15 is then removed allowing the park brake 10 to move to the releasing position, shown in FIG. 6. In the releasing position, the return spring 85 exerts a force on the brake lever 15 to return the brake lever 15 to the nominal or starting position. The linkage 90 remains positioned in the cam over position towards the right in the figure. The tension force on the spring member 105 has caused the negative rotation of the pawl 60 relative to the sector 50 to disengage the pawl 60 from the sector 50 returning the spring member 105 to a free state. In the releasing position, the pawl 60 no longer engages the sector 50 and the brake lever 15 is free to move from the applied position toward the nominal position.

Figure 7:
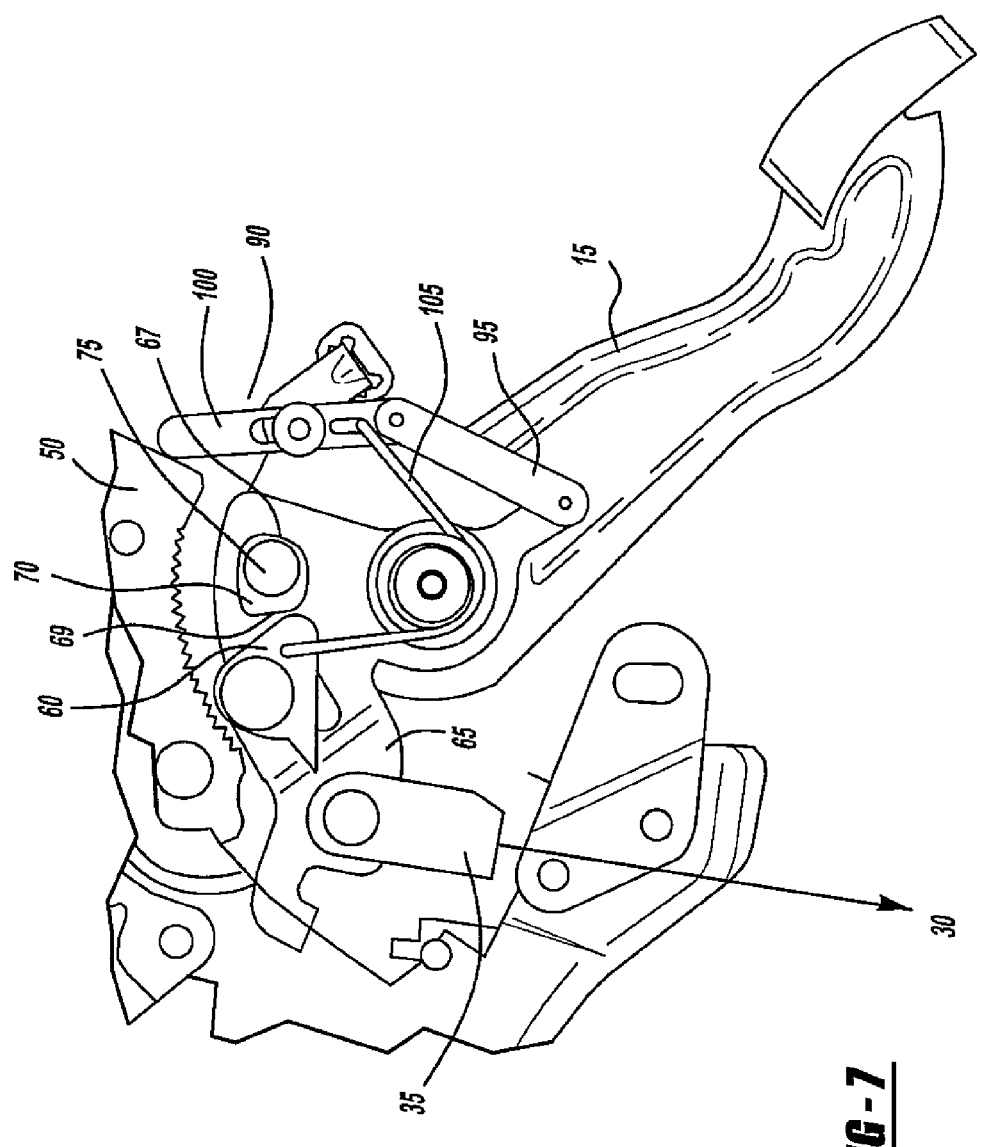
FIG. 7 is a partial side view of a park brake in a recock position.
Figure 8:
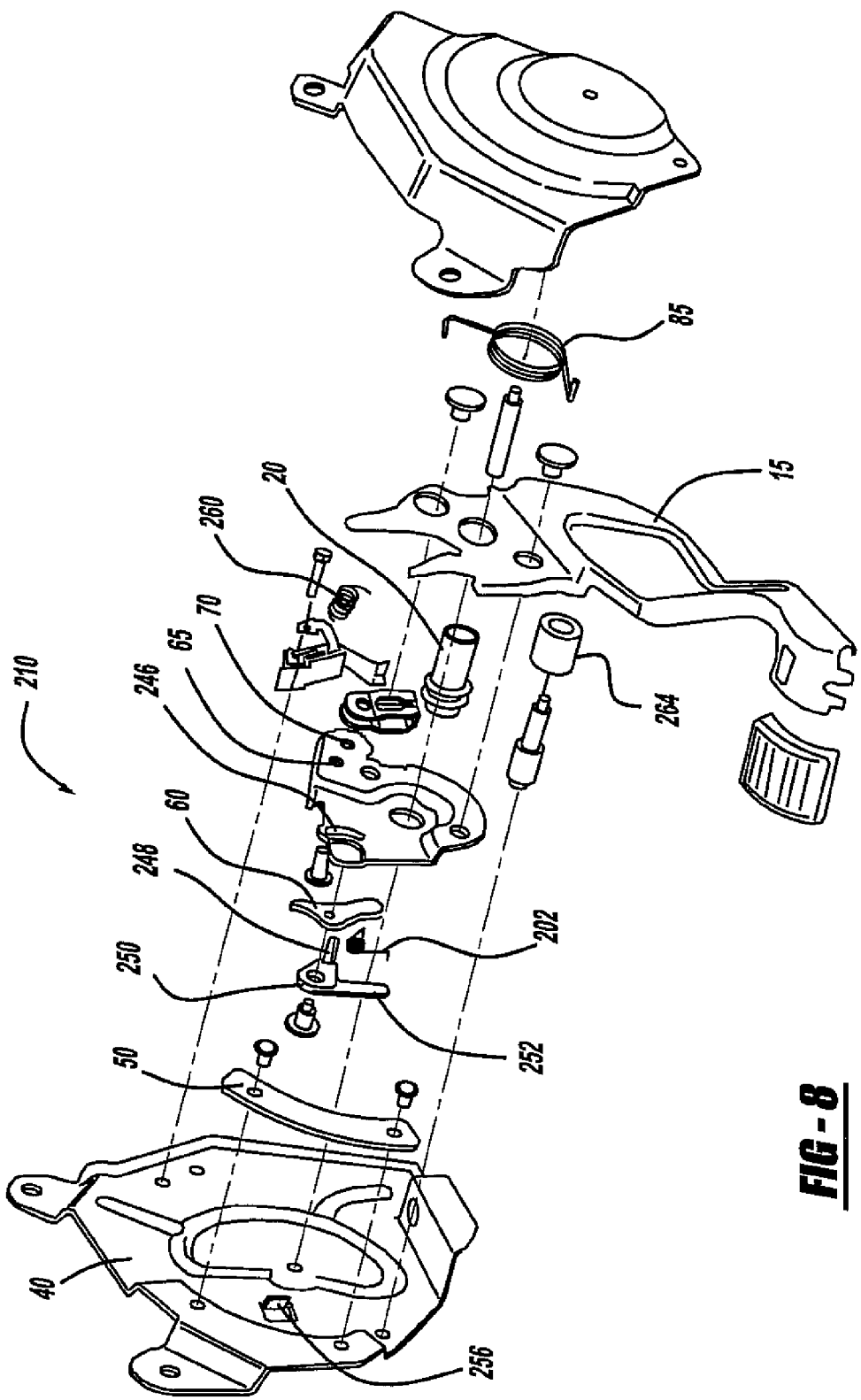
FIG. 8 is an exploded assembly view of a second embodiment of a park brake.

The brake lever 15 continues to travel towards the nominal position in response to the force applied by the return spring 85. As the brake lever 15 continues its travel toward the nominal position, the linkage 90 contacts the sector 50 in a recock position, as shown in FIG. 7. While the linkage 90 contacts the sector 50 in the depicted embodiment, it should be realized that the linkage 90 may contact any fixed member, such as a bracket, extension or other fixed member. In the recock position, the linkage 90 contacts the sector 50 with the second link 100 having a point-to-point contact with the sector 50 such that the linkage 90 is moved to the starting position from the cam over position, as the force applied by the return spring 85 causes the linkage 90 to move back over center to the starting position. Once the linkage 90 has moved fully over center, the park brake 10 is now positioned in the fully released position with the brake lever 15 in the nominal position.

The park brake 10 described herein reduces cable travel loss from the independent movement of the release mechanism 25 and brake lever 15. Additionally, cable travel loss is minimized utilizing a sector 50 and pawl 60 with the sector 50 designed with a plurality of teeth 55 having optimized design characteristics. Cable travel loss from 0.1 millimeters to 1.5 millimeters may be achieved utilizing the park brake 10 as described herein.

Referring to FIGS. 8-14, there is shown a second alternative embodiment of a park brake 210. The park brake 210, as with the first embodiment includes a brake lever 15 that is movable about a pivot 20. A release mechanism 25 is associated with the brake lever 15. The release mechanism 25 may be actuated to allow selective movement of the brake lever 15. Additionally a cable 30, as with the first embodiment is connected to the release mechanism 25 and is isolated from movement of the brake lever 15.

As with the previously described first embodiment, the alternative embodiment includes a housing 40 that may be attached to a vehicle using appropriate mounting points or bracketry 45. Additionally, the housing 40 may include various slots and attachment points for connecting with the various components as will be described in more detail below.

As with the previously described embodiment, a sector 50 is attached to the housing 40. The sector 50 may have an arcuate shape with a plurality of teeth 55, as described above, formed thereon for engaging a pawl 60. A pawl plate 65 may be positioned such that it is movable about the pivot 20 and contacts the brake lever 15. The pawl plate 65 includes a lost motion slot 70 formed therein. A rivet 75 associated with the brake lever 15 may be positioned within the lost motion slot 70 and is movable within the lost motion slot 70 allowing for independent movement of the brake lever 15 and the pawl plate 65 decoupling the release mechanism 25 from the brake lever 15. The pawl plate 65 also includes the pawl 60 having a fixed pivot. The pawl is adapted to contact and lock with the sector 50. Additionally, the pawl plate 65 also includes a trigger slot 246 formed therein. The trigger slot 246 receives a projection 248 formed on a trigger 250, as will be described in more detail below.

The trigger 250, as shown in the figures, rotates about the same axis as the pawl 60. It should be realized that the trigger 250 may rotate on an independent axis relative to the pawl 60. The trigger 250 includes a leg portion 252 and the projection 248. The projection 248 is adapted to contact a brake lever tab 254. A housing tab 256 is adapted to contact the leg portion 252 to move the projection 248 within the trigger slot 246 formed in the pawl plate 65. Movement of the projection 248 within the trigger slot 246 actuates the release mechanism 25, as will be discussed in more detail below.

As with the previously described embodiment, the park brake 210 may include a return spring 85 that may be attached to the cover plate 80 at a first end of the return spring 85 with a second end attached to the pawl plate 65. The return spring 85 applies a force to the pawl plate 65 to return it to a nominal starting position relative to the housing 40. The park brake may also include a biasing spring 260 connected to the brake lever 15 at one end of the biasing spring 260 and to the pawl plate 65 at another end of the biasing spring 260. The biasing spring 260 applies a force between the brake lever 15 and the pawl plate 65 that is less than and opposite that of the return spring 85. Force applied by this biasing spring 260 moves the brake lever 15 relative to the pawl plate 65, as will be discussed in more detail below.

The park brake 210 also includes a pawl spring 262 having one end attached to the pawl 60 and another end attached to the trigger 250. The pawl spring 262 exerts a force vector on the pawl 60 to lock and unlock the pawl 60 from the sector 50. The force vector can be changed or adjusted in response to movement of the projection 248 on the trigger 250 within the trigger slot 246 formed in the pawl plate 65.

Figure 9A:
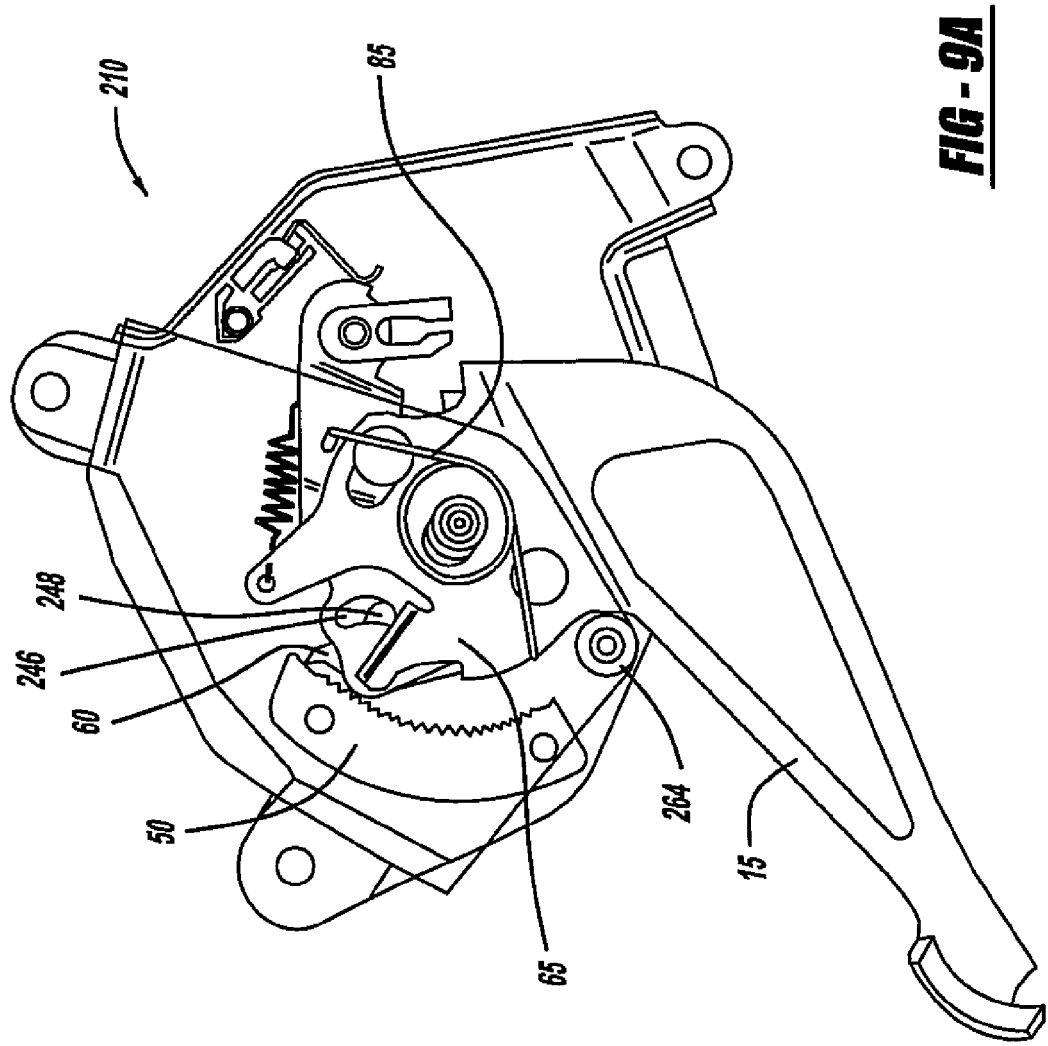

In use, the park brake 210 starts in a nominal position wherein the release mechanism 25 is fully released, as shown in FIGS. 9A and 9B. As can be seen, the brake lever 15 is located against a stop 264 attached to the housing 40. The return spring 85 rotates the pawl plate 65 to the starting or nominal position. The pawl 60 is rotated into the sector 50 as a result of the force vector of the pawl spring 262 but the pawl 60 is not locked with the sector 50 as there are no teeth formed in the sector 50 at the start of the sector travel path. The projection 248 on the trigger 250 is positioned in a starting position within the trigger slot 246 formed in the pawl plate 65.

Figure 10B:
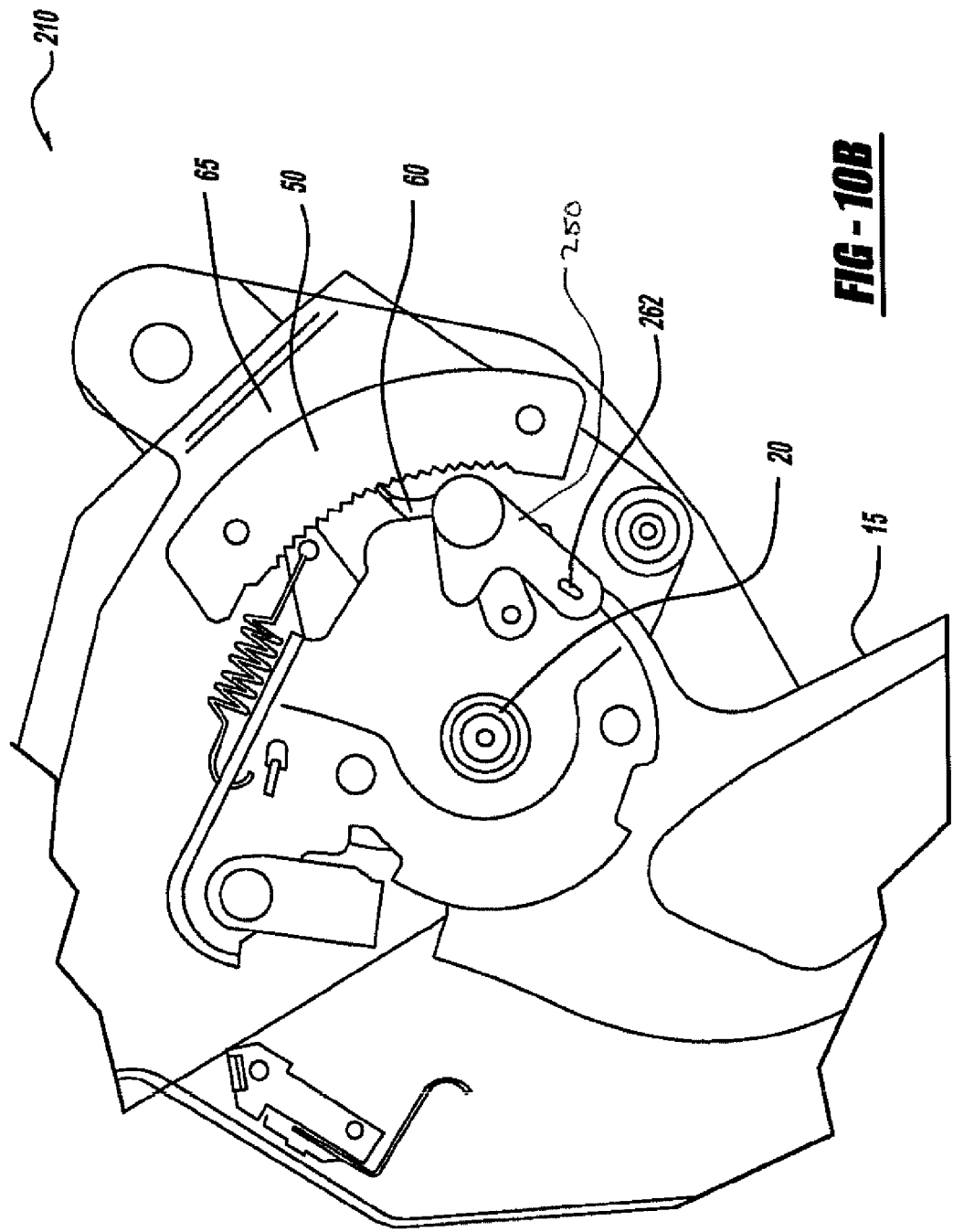

When an operator applies a positive force on the brake lever 15, the park brake 210 is in an applying position as shown in FIGS. 10A and 10B. The force applied to the park brake lever 15 causes rotation of the brake lever 15 about the pivot 20 causing the pawl plate 65 to rotate. The projection 248 on the trigger 250 remains in the starting position within the trigger slot 246 formed in the pawl plate 65. The pawl 60 can lock relative to the sector 50 due to the force vector applied by the pawl spring 262.

Figure 11A:
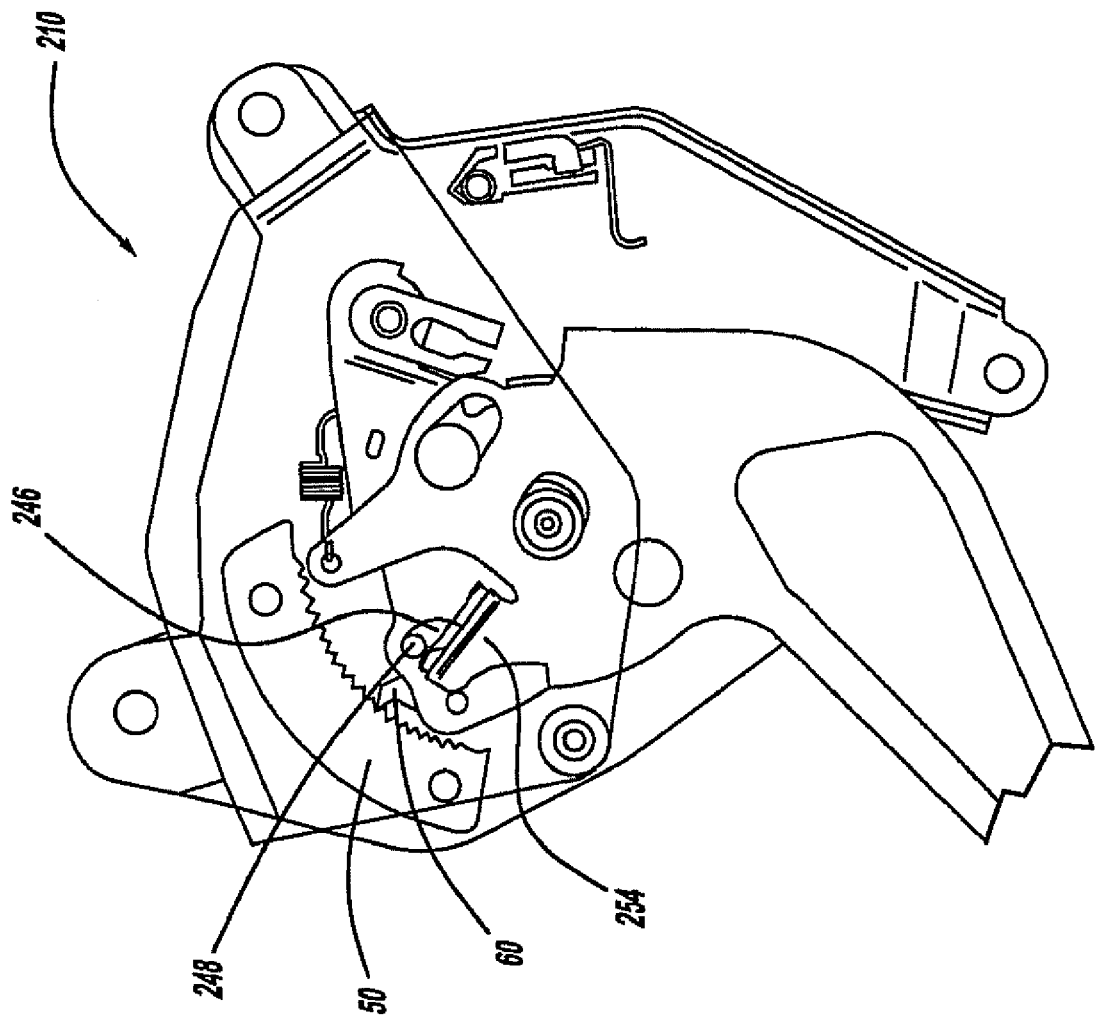

When the force is removed from the brake lever 15, the park brake 210 is now in the locked position, as shown in FIG. 11. In the locked position, the pawl 60 locks with the sector 50 such that the pawl plate 65 is in the locked position. The biasing spring 85 connected to the brake lever 15 and pawl plate 65 causes the brake lever 15 to rotate relative to the pawl plate 65. The brake tab 254 formed on the brake lever 15 contacts the projection 248 of the trigger 250 moving the projection 248 within the trigger slot 246 formed in the pawl plate 65 from the starting position to the secondary position. Movement of the projection 248 and trigger 250 in the trigger slot 246 causes the pawl spring 262 to rotate about the connection with the pawl 60. The force vector applied by the pawl spring 262 is changed as a result of the rotation of the pawl spring 262. The force vector is switched causing the moment of the pawl 60 into the sector 50 in the starting position to a moment out of the sector 50 in the secondary position. The locking angle of the sector teeth 55 and pawl geometry keeps the pawl 60 locked into engagement with the sector 50.

Figure 12A:
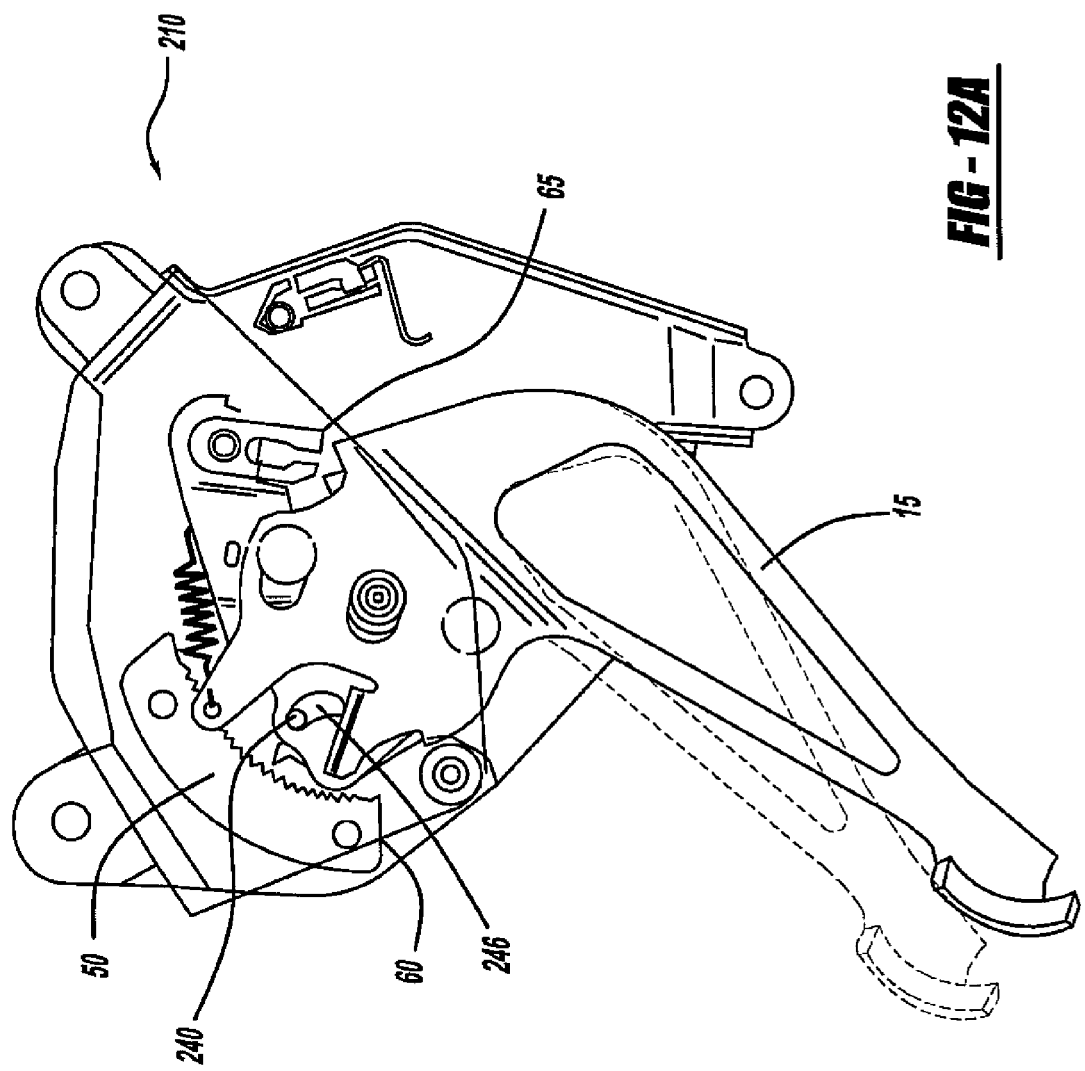

To release the brake lever 15 from the applied position the force is reapplied to the brake lever 15 as shown in FIGS. 12A and 12B. As can be seen in the figures, a force applied to the brake lever 15 transfers the load that was applied to the pawl 60 when engaging the sector 50 to the brake lever 151. The projection 248 formed on the trigger 250 remains in the secondary position in the trigger slot 246 formed in the pawl plate 65. In this position, the pawl spring 262 exerts a force vector on the pawl 60 causing the pawl 60 to rotate out of the sector 50 when the load on the pawl is removed due to the operator's foot load on the pedal unlocking the release mechanism 25.

The force reapplied to the brake lever 15 is then removed allowing the park brake 210 to move to the unapplied or released position shown in FIGS. 9A and 9B. The force vector of the pawl spring 262 has caused rotation of the pawl 60 out of the sector 50 to disengage the pawl 60 from the sector 50. The brake lever 15 continues to travel towards the nominal position in response to the force applied by the return spring 85. As the brake lever 15 continues its travel toward the nominal position, the trigger leg 252 contacts a housing tab 256 located on the housing 40 moving the projection 248 in the trigger slot 246 from the secondary position to the starting position. In response to the movement of the projection 248 in the trigger slot 246, the pawl spring 262 rotates about the connection point to the pawl 60 again changing the force vector. The force vector is returned to the starting position and applies a moment to the pawl 60 into the sector 50. The brake lever 15 continues rotating until it contacts a stop 264 formed on the housing 40. The park brake 210 is now positioned in the fully released position with the brake lever 15 in the nominal position.

Referring to FIGS. 13-16, there is shown a third embodiment of a park brake 310. In the third embodiment, the park brake 310 includes the components as described with reference to the second embodiment with the exception that the trigger 250 has been removed from the release mechanism 25. In this embodiment, the pawl spring 362 includes a leg 363 that is positioned to travel within a trigger or spring slot 346 formed in the pawl plate 65. The leg 363 formed on the pawl spring 362 moves within the spring slot 346 in a manner that is similar to that previously described with reference to the trigger 250 and projection 248. As with the previously described embodiment, the leg 363 of the pawl spring 362 travels within the spring slot 346 to change the moment applied to the pawl 60 into and out of the sector 50.

In use, the third embodiment in the nominal or released position as shown in FIG. 13 similarly displays the pawl 60 engaging the non-toothed portion of the sector 50. The pawl spring 363 is under compression and the rivet associated with the pedal arm 15 is positioned in the first side of the lost motion slot 70 slot formed in the pawl plate 65.

In the applied position, shown in FIG. 14, the release mechanism is activated such that the pawl 60 is engaged with the sector 50. The force applied to the park brake lever 15 causes rotation of the brake lever 15 about the pivot 20 causing the pawl plate 65 to rotate. The pawl spring leg 363 remains in the starting position within the spring slot 346 formed in the pawl plate 65. The pawl 60 can lock relative to the sector 50 due to the force vector applied by the pawl spring 262.

Figure 15:
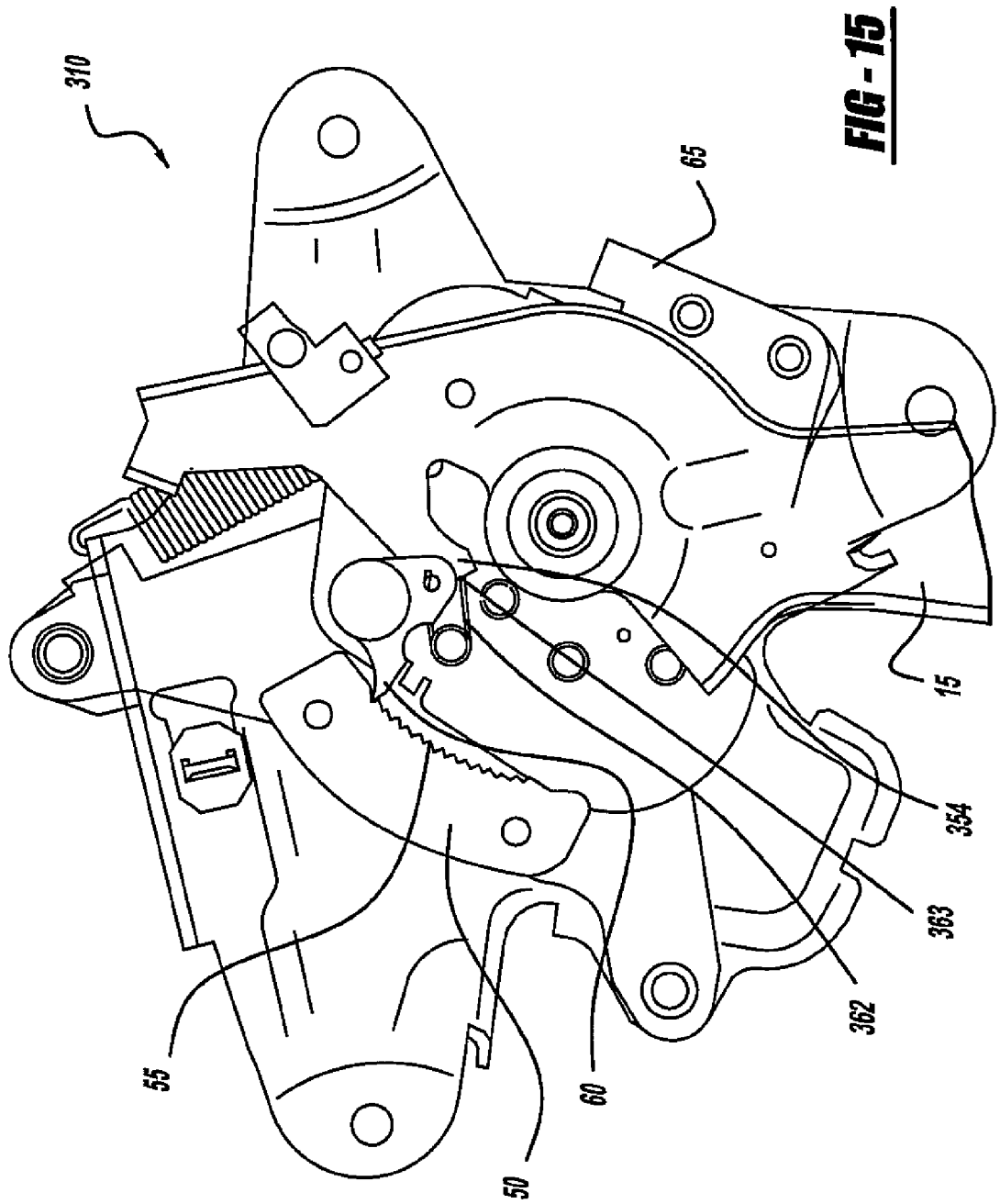
FIG. 15 is a partial side view of a third embodiment in a locked position.

When the force is removed from the brake lever 15, the park brake 310 is now in the locked position, as shown in FIG. 15. In the locked position, the pawl 60 locks with the sector 50 such that the pawl plate 65 is in the locked position. The biasing spring 85 as described above is connected to the brake lever 15 and pawl plate 65 causes the brake lever 15 to rotate relative to the pawl plate 65. The brake tab 354 formed on the brake lever 15 contacts the leg 363 of the pawl spring 362 moving the leg 363 within the spring slot 346 formed in the pawl plate 65 from the starting position to the secondary position. Movement of the leg 363 in the spring slot 346 causes the pawl spring 362 to rotate about the connection with the pawl 60. The force vector applied by the pawl spring 362 is changed as a result of the rotation of the pawl spring 362. The force vector is switched causing the moment of the pawl 60 into the sector 50 in the starting position to a moment out of the sector 50 in the secondary position. The locking angle of the sector teeth 55 and pawl geometry keeps the pawl 60 locked into engagement with the sector 50.

To release the brake lever 15 from the applied position the force is reapplied to the brake lever 15 as shown in FIG. 15. As can be seen, a force applied to the brake lever 15 transfers the load that was applied to the pawl 60 when engaging the sector 50 to the brake lever 15. The leg 363 remains in the secondary position in the spring slot 346 formed in the pawl plate 65. In this position, the pawl spring 362 exerts a force vector on the pawl 60 causing the pawl 60 to rotate out of the sector 50 unlocking the release mechanism 25.

The force reapplied to the brake lever 15 is then removed as shown in FIG. 16 allowing the park brake 310 to move to the unapplied or released position shown in FIG. 13. The force vector of the pawl spring 362 has caused rotation of the pawl 60 out of the sector 50 to disengage the pawl 60 from the sector 50. The brake lever 15 continues to travel towards the nominal position in response to the force applied by the return spring 85. As the brake lever 15 continues its travel toward the nominal position, the pawl spring 362 contacts a housing tab 256 as shown in the previous embodiment located on the housing 40 moving the leg 363 in the spring slot 346 from the secondary position to the starting position. In response to the movement of the leg 363 in the spring slot 346, the pawl spring 362 rotates about the connection point to the pawl 60 again changing the force vector. The force vector is returned to the starting position and applies a moment to the pawl 60 into the sector 50. The brake lever 15 continues rotating until it contacts a stop 264, as described in the previous embodiment formed on the housing 40. The park brake 310 is now positioned in the fully released position with the brake lever 15 in the nominal position.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A park brake comprising:
a brake lever including a brake tab, the brake lever movable about a pivot;
a pawl plate rotatable about the pivot and contacting the brake lever;
a release mechanism associated with the brake lever, the release mechanism including a pawl pivotally connected to the pawl plate, the pawl reversibly contacting and locking with a stationary sector;
a trigger pivotally coupled to the pawl plate;
the trigger reversibly moving from a starting position to a secondary position in response to contact with the brake tab changing a moment of the pawl relative to the sector selectively locking movement of the brake lever.

2. The park brake of claim 1 including a cable connected to the release mechanism, the cable isolated from movement of the brake lever.

3. The park brake of claim 1 wherein the brake lever includes a rivet associated therewith and the pivot is coupled to a housing.

4. The park brake of claim 3 wherein the sector is attached to the housing.

5. The park brake of claim 1 wherein the pawl plate includes a lost motion slot, the rivet associated with the brake lever positioned within the lost motion slot and movable within the lost motion slot for allowing independent movement of the brake lever and the pawl plate.

6. The park brake of claim 1 including a biasing spring connected at one end to the pawl plate and at another end to the brake lever.

7. The park brake of claim 1 including a return spring attached at one end to the pawl plate and at another end to a fixed member relative to a vehicle.

8. The park brake of claim 1 wherein the trigger includes a projection disposed within a trigger slot formed in the pawl plate.

9. The park brake of claim 1 including a pawl spring having a first end and a second end, the first end attached to the pawl and the second end attached to the trigger.

10. The park brake of claim 9 wherein a force applied to the brake lever moves the brake lever tab contacting the trigger moving the trigger from the starting position to the secondary position relative to the trigger slot causing the pawl spring to rotate about the pawl changing the moment of the pawl relative to the sector.

11. The park brake of claim 10 wherein the moment of the pawl is into the sector in the starting position and out of the sector in the secondary position.

12. The park brake of claim 10 wherein the pawl unlocks from the sector in response to a tension force of the pawl spring in the secondary position when a force is reapplied to the brake lever.

13. The park brake of claim 10 wherein the housing includes a housing tab formed thereon.

14. The park brake of claim 13 wherein the housing tab contacts the trigger moving the trigger from the secondary position to the starting position relative to the trigger slot causing the pawl spring to rotate about the pawl changing the moment of the pawl relative to the sector.

15. The park brake of claim 1 wherein the trigger comprises a pawl spring having a leg at one end of the pawl spring and attached to the pawl at another end of the pawl spring.

16. The park brake of claim 15 wherein the leg is disposed within the trigger slot formed in the pawl plate.

17. The park brake of claim 15 wherein the brake lever tab contacts the leg of the pawl spring.

18. The park brake of claim 17 wherein a force applied to the brake lever moves the brake lever tab contacting the leg of the pawl spring moving the leg of the pawl spring from a starting position to a secondary position relative to the trigger slot causing the pawl spring to rotate about the pawl changing the moment of the pawl relative to the sector.

19. The park brake of claim 18 wherein the moment of the pawl is into the sector in the starting position and out of the sector in the secondary position.

20. The park brake of claim 19 wherein the pawl unlocks from the sector in response to a tension force of the pawl spring in the secondary position when a force is reapplied to the brake lever.

21. The park brake of claim 18 wherein the housing includes a housing tab formed thereon.

22. The park brake of claim 21 wherein the housing tab contacts the pawl spring moving the pawl spring from the secondary position to the starting position relative to the trigger slot causing the pawl spring to rotate about the pawl changing the moment of the pawl relative to the sector.

* * * * *